No. 845,959. PATENTED MAR. 5, 1907.
W. G. LIEBIG.
BRUSH MAKING MACHINE.
APPLICATION FILED OCT. 28, 1905.

WITNESSES
C. C. Day
Lotta Lee Hayton.

INVENTOR
William G. Liebig

By Parker & Burton.
Attorneys.

No. 845,959. PATENTED MAR. 5, 1907.
W. G. LIEBIG.
BRUSH MAKING MACHINE.
APPLICATION FILED OCT. 28, 1905.

WITNESSES
C. E. Day.
Lotta Lee Hayton.

INVENTOR
William G. Liebig
By Parker + Burton.
Attorneys.

UNITED STATES PATENT OFFICE.

WILLIAM G. LIEBIG, OF DETROIT, MICHIGAN.

BRUSH-MAKING MACHINE.

No. 845,959.      Specification of Letters Patent.      Patented March 5, 1907.

Application filed October 28, 1905. Serial No. 284,788.

*To all whom it may concern:*

Be it known that I, WILLIAM G. LIEBIG, a citizen of the United States, residing at Detroit, county of Wayne, State of Michigan, have invented a certain new and useful Improvement in Brush-Making Machines, and declare the following to be a full, clear, and exact description of the same, such as will enable others skilled in the art to which it pertains to make and use the same, reference being had to the accompanying drawings, which form a part of this specification.

This invention relates to brush-making machines.

It has for its object an improved machine in which the bristles constituting a tuft to be used for the formation of a brush are automatically gathered from a receptacle and carried to the base of the machine, where they are engaged by a staple that is automatically made from a strand of wire. The staple straddling the tuft of bristles is driven into the brush-back and the tuft is secured to the back.

All the operations of the machine are automatic except the locating of the brush-back in the proper position to have the staple driven into it.

The several parts and details of the machine are shown in the accompanying drawings, in which—

Fig. 9 is a cross-section through the bristle-hopper. Fig. 12 is a side view of the carrier. Fig. 13 is an enlarged view of the slide-plate 78. Fig. 14 is a side view of the carrier. Figs. 12 and 14 show opposite sides. Fig. 15 is a view, on an enlarged scale, of the plate 20 shown in Fig. 12 and the immediately adjacent portion of the carrier.

In this brush-making machine there is contained an adjustable table on which the back of the brush rests during its making. Above this is a guide, nozzle-like in form, through which reciprocates a hammer-plunger that forces down a tuft of bristles through the guide and with the tuft a staple by means of which the bristles are secured to the brush-back. Above the nozzle is a horizontally-reciprocating anvil, over which is carried the end of a wire from which the staple is made. A wire-cutter and staple-former through which the plunger passes and which itself reciprocates vertically in guides is located above the anvil.

The staple-former is reciprocated by mechanism that is independent of that which actuates the hammer-plunger. Across the path of the hammer-plunger below the staple-former swings the end of an oscillatory bristle gatherer and carrier which gathers from the face of a mass of bristles held in a suitable box-like receptacle a sufficient quantity of bristles to form a tuft, carries this tuft into the path of the hammer-plunger, where the legs of the staple will straddle the tuft, and over an opening through which the staple and the tuft are forced into the nozzle or guide, and thence into the brush-back. These various parts are driven in their reciprocations and oscillations by gearing and levers connected therewith that are located behind the head of the machine and which are primarily driven by a master-wheel and are timed to coact properly.

The entire mechanism is driven by a master-wheel A, to whose shaft motion is given by a clutch-wheel K and clutch k. This motion is given from any convenient source of power and in any convenient way.

On each face of the master-wheel A is a cam, and of these the cam 37 actuates the hammer-plunger lever 7, and the cam 32 on the opposite face of the master-wheel actuates the lever 28, which in turn actuates the bristle gatherer and carrier. The gatherer is composed of several parts hung by an arm 40 to a pin 161, that projects from the front face of the machine.

The master-wheel also drives a gear 50, that acts as actuator for the mechanism by which the wire is fed under the staple-cutter. The gear in turn drives a cross-shaft 52, upon which there are cams that actuate the wire-cutter lever 11 and the anvil 10.

At the front of the machine rise two posts 71 and 72, which furnish guides for a vertically-reciprocating plunger-head 73, that carries the hammer-plunger 13. The head 73 travels in guides on the opposing faces of the posts 71 and 72. Through the head 73 is an opening through which projects the end of the hammer-actuating lever 7, resting upon an antifriction-roller 74, that is journaled in ears at the forward side of the head 73. From the head above the opening projects a pin 79, that coacts with the gatherer, as will be hereinafter explained.

Figure 1:
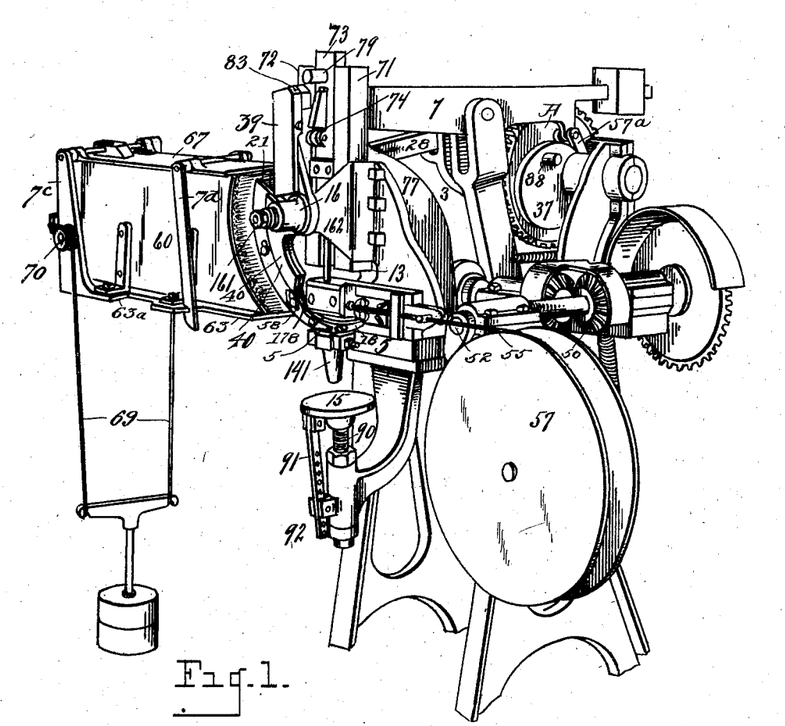
Figure 1 is a perspective of the assembled machine.
Figure 2:
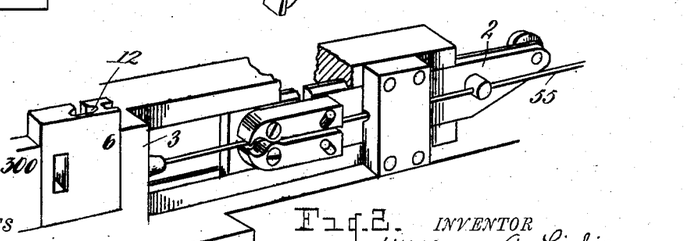
Fig. 2 is a perspective of the wire-feed.
Figure 3:
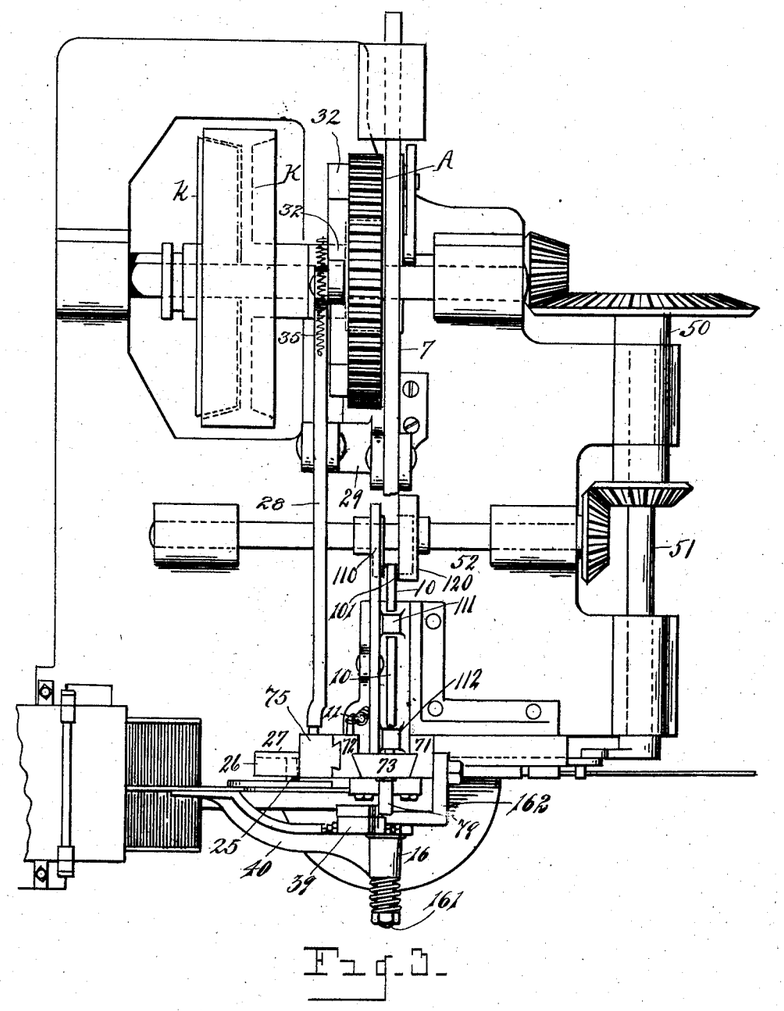
Fig. 3 is a plan view. The front of the hammer-lever is broken away in this view.
Figure 4:
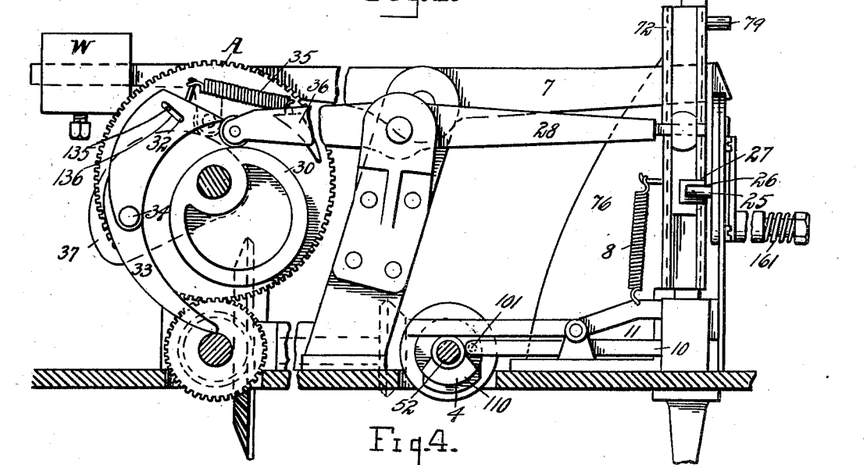
Fig. 4 is an elevation showing the hammer-lever actuator, carrier-actuator, and anvil-actuator.
Figure 5:
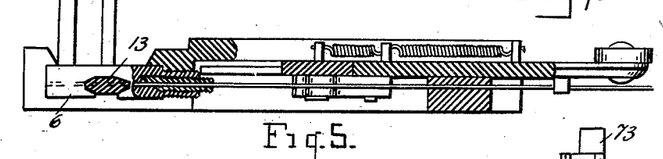
Fig. 5 is a horizontal section through the wire-feeding mechanism.
Figure 6:
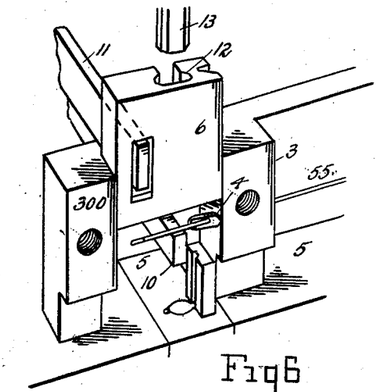
Fig. 6 is a perspective showing the wire-cutting and staple-forming part of the machine.
Figure 7:
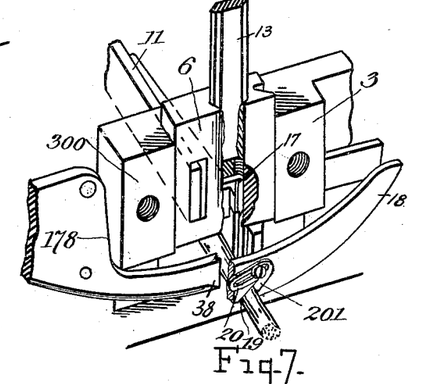
Fig. 7 is a perspective showing the bristle-carrier crrying a tuft of bristles into the staple forming and driving channel.
Figure 8:
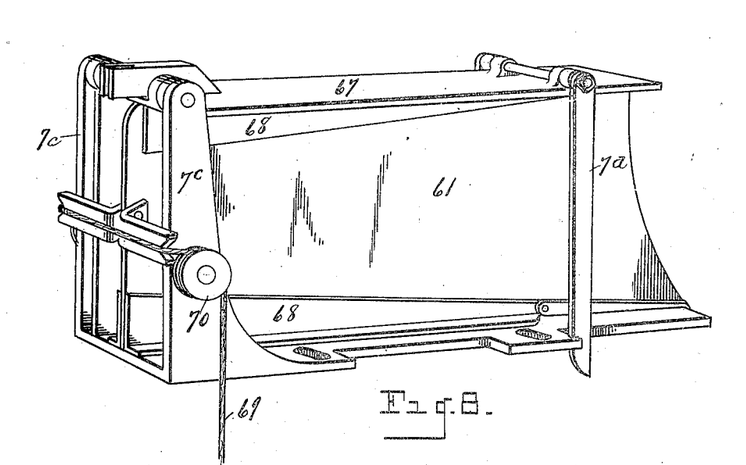
Fig. 8 is a perspective of the bristle-hopper. The side of the hopper nearest to the observer is removed.
Figure 10:
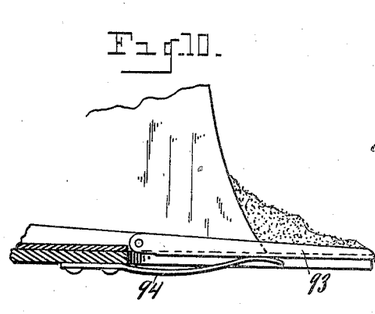
Fig. 10 is an enlarged view of the yielding finger at the front end of the hopper.
Figure 11:
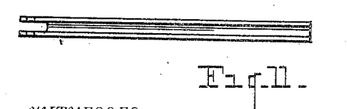
Fig. 11 is a bottom view of the yielding finger.

The two posts 71 and 72 are carried on the forward edges of brackets, of which that one which supports the post 71 is seen at 77 in Fig. 1, and do not extend to the base-plate 5 of this part of the machine; but a pair of posts 3 and 300 rise from the base 5 in substantial alinement with the posts 71 and 72. Between these posts 3 and 300 is a block 6, adapted to reciprocate in the same way as the hammer-plunger 73, but actuated in its reciprocation by a lever 11. This lever 11 is oscillated by cam 110 on the shaft 52, the rear end of the lever being lifted by this cam and the forward end being lifted by spring 8, that reaches from the lever 11 to a hook on the post 72. The block 6 is a wire-cutter and staple-former and cuts the wire 55, fed into position for such cutting by mechanism that will be referred to hereinafter. The block bends the ends of the piece of wire that has been clipped off down over an anvil 10, timed to locate itself under the wire at the time the wire is cut and to remain so located until the ends are bent and then to be withdrawn by cam 120, which is a grooved cam having a groove in the face thereof in which engages an antifriction-roller 101 on the end of the anvil-handle 10. The cam causes the anvil to slide in reciprocation through guides 111 and 112.

The wire 55 is fed through an opening in the post 3 and through an opening in a hardened nipple 4. The front of that end of the nipple which extends inward from the post 3 is cut on an incline to produce a long wedge-like or a pointed cut of the wire, suitable to produce a pointed end to the leg of the staple. The wire drawn from the reel 57 is carried between the jaws of a gripper device, (which need not be described, as it forms no part of the present invention.) The gripper is actuated by a cam at the end of the shaft 51 and is timed to grip the wire, advance it properly with respect to the action of the hammer, and retreat preparatory to a subsequent advance of the wire.

The bristles are gathered from the face of a bristle-holding receptacle 60 by means of a gathering and carrying device which oscillates on the stud or pin 161, carried by bracket 162 from the post 71.

The carrier is an oscillating member having several parts. The main part has two arms 40 and 41 springing from a hub portion 16. The part 40 normally hangs from the hub and sustains at its lower end a long arched foot having a peripheral length along the arch equal to about three times the normal oscillation. That part of the foot located on what may be considered the forward side of the arm 40 is much longer than the oppositely-located part and terminates with a somewhat-acutely-pointed toe 18. About one-third of the distance along the foot from the toe toward the heel 21 is a notch 19, extending inwardly from the edge of the carrier and inclining forward toward the toe. The extreme toe portion is reinforced and partly formed by a plate 181, which is secured to the toe part of the carrier by bolts 188, which engage through oval slots in the portion 18, thus permitting adjustment of this plate to vary the width of the notch 19, and, further, in the event of its inner end, which forms the acute-angled projection at one side of the notch, being broken off by accidental engagement against a hard substance the remaining portion of the plate 181, after being removed and sharpened, can be readjusted, so as to make the notch 19 the same size as before the accident, thus obviating the necessity of discarding the entire carrier, which would be a matter of considerably greater expense. A small and easily-adjustable filler-plate 20, provided with a finger 201, (illustrated in detail in Fig. 15,) makes possible a variation in the depth of the notch. The plate is held by a bolt extending through its oval center portion into the body of the peripheral portion of the carrier, the finger, which extends transversely of the peripheral edge, obstructing the notch 19, as illustrated.

To the rear of the notch 19 and about two-thirds of the distance between the toe and the heel is a curved indentation or clearance-notch 182, which affords periodical open periods to the notch 82, whose depth may be regulated by means of a plate similar in shape and function to the filler-plate 201, just described, which is in the engaging peripheral edge of a sliding plate 78, that is held by the foot portion 401 of the carrier on bolts which engage through specially-shaped slots 53 and 58 in the foot 401. The plate 78 engages over that part of the carrier which extends between the notch 19 and the indentation or clearance-notch 182 and past it some distance to the rear. The forward edge of the narrowed portion of the plate 78 has a vertical groove $38^a$, which is normally radial to the hub of the carrier. The particular office and function of this indentation or clearance-notch will be explained in a later paragraph.

The plate 78 is held at the rear by a bolt 54, which passes through an elliptical slot 53 in the plate portion of the foot 401. Midway between the front and rear of the plate 78 is a bolt 59, that engages through an irregularly-shaped slot 58, the outline of which may be compared to a trefoil, with a long opening parallel with the arched edge of the foot and with a half-circle extension 61 midway between the ends of the slot and on that side of the slot which lies toward the hub 16. The plate 78 between the openings 53 and 58 widens and assumes a shape somewhat triangular in outline, with the apex of the triangle rising toward the hub 16. Near the apex of the triangular part is a stud 25, carrying an antifriction-roller through which the actuation for the oscillation of the entire carrier is imparted. The plate 78 is adapted, by reason of the construction described, to have not only the swinging motion, during which it accompanies the main part of the carrier, but is adapted to have also a sliding and oscillating motion upon the main part of the carrier. To this end the pins 54 and 59, which engage through elongated slots, permit the plate 78 to slide on and with respect to the main part of the carrier and to precede it in its advance and in its retreat for a distance limited by the size of the slots 53 and 58. It also allows the plate 78 after it has shifted through a portion of its independent movement to swing on the pin 54 until the pin 59 engages in the extension 61 of the slot 58.

The main reciprocating actuation of the carrier is effected by the engagement of the pin 25 in the horizontal cross-slot 26 in a vertical reciprocating slide 75, which engages in a vertical recessed track or groove in the frame of the machine. Because of its suspension upon the stud or pin 161, which is fixed with respect to the machine as a whole, the carrier is thus enabled to have its own curved path of travel, although the guides and actuators which produce the travel have vertical movement only. The pin 25, engaging in the cross-head of the vertically-reciprocating slide 75, gives to the plate 78 a swinging or oscillating motion, which after some intentional delay is communicated to the entire carrier, this delay being caused by the fact that when the downward actuation of the reciprocating slide 75 begins the plate 78 is as near the heel portion 21 of the carrier 40 as the size of the slots 53 and 58 permit, and not until the plate 78 has under this actuation slid as far forward on the carrier as the limits of these slots permit is the pressure upon the pin 25 communicated fully and directly to the carrier as a whole. The vertical slide 75 does not, however, convey a steady reciprocating motion, but is driven by cam 30, against which the end of the driving-lever 28 is held by the yielding guide 32 during a portion of the revolution of the cam. During the time that the carrier is thus held by engagement of the antifriction-roller on the end of the lever 28 between the cam 30 and the yielding guide 32 the arm 41 of the carrier is engaged by the pin 79, which projects from the front of the reciprocating plunger-head 73. This pin first engages the short inclined surface 83 at the upper end of the branch 41 of the carrier, causing the main body of the carrier, which has by this time swung forward nearly to its extreme position, to advance in the direction of the toe part 18 faster than the plate 78, which is not rigid with respect to the body portion of the carrier, resulting in the opening of the notch 19, which contains the tuft of bristles. The pin 79 next strikes an incline 84 on the projection 81 on the other edge of the branch 41. This jolts the carrier sharply, though very slightly as regards actual displacement in the opposite direction until the forward edge 178 of the plate 78, which faces toward the toe 18 of the foot and to which some of the motion of the carrier has by this time been imparted, has engaged against the post 300, so that it can move no further forward. This last movement clears the carrier from the tuft, which is thereby deposited in position for the descent of the staple. The end 38 of the plate 78 is grooved, as shown at 38$^a$ in Fig. 13, and in the position of the plate 78, just described, by the side of the guide-hole 14 it serves as a guide for the staple 17.

To understand the action of the carrier part of the machine, suppose the hammer to be at the upper end of its stroke, the carrier to be retracted, and the plate 78 to be drawn back so that its end 38 is drawn from over the mouth of the slot 19. In this position the slot 82 in the plate 78 is drawn back so that it is somewhat to the rear of the indentation or clearance-notch 182 in the periphery of the body portion of the carrier. The carrier-actuator begins to descend before the hammer begins its stroke and moves the plate until the end 38 closes the mouth of the slot 19, and the two together complete their oscillation until the slot with the bristles in it rests over the hole 14. The plate 78 engages against and is stopped by the post 300, and the upper end of the arm 39 is in position to allow the pin 79, which is carried by the reciprocating plunger 73, to engage successively the lugs or projections 83 and 84 hereinbefore described. The hammer-head now begins to descend, the pin 79 engages the lugs, moving the carrier somewhat, though still leaving the plate 78 bearing against the post 300. The stroke of the pin 79 upon the lower projection 84 on the arm 41, as heretofore stated, retracts the arm 40 of the carrier, which then remains at rest until the plate 78 is retracted to bring the pin 59 directly opposite the extension 61 of the slot 58. The carrier-actuator begins to rise, and its first movements lifts the plate 78 radially inward to the limit of the extension 61 of the slot 58, after which the carrier continues on its upward travel to complete its swing.

While the carrier is on its downward stroke and the forward movement of the plate 78 with respect to the body portion of the carrier has closed the notch 19, it has brought the notch 82 into registering position with respect to the clearance-notch or indentation 182, which during the downward movement of the carrier becomes filled with bristles, which it gathers from the extreme forward portion of the store in the feed-box, carrying them downwardly toward the lower and forward edge of the pile in position for most convenient seizure within the notch 19 on the next upward movement of the carrier. When the carrier again swings up with the notch 19, gathering the supply of bristles for the next delivery-stroke of the carrier, that part of the periphery of the plate 78 which contains the gathering-notch 82 slides with respect to the body portion of the carrier so that it is no longer in register with the indentation 182 and with it swings above and entirely clear of the exposed supply of bristles. This continuation of the upward movement of the carrier causes the pin 59 to slip out of the extension 61 of the slot 58, into which it fell during the first part of the upward movement just described.

Figures 12, 13, 14, 15:
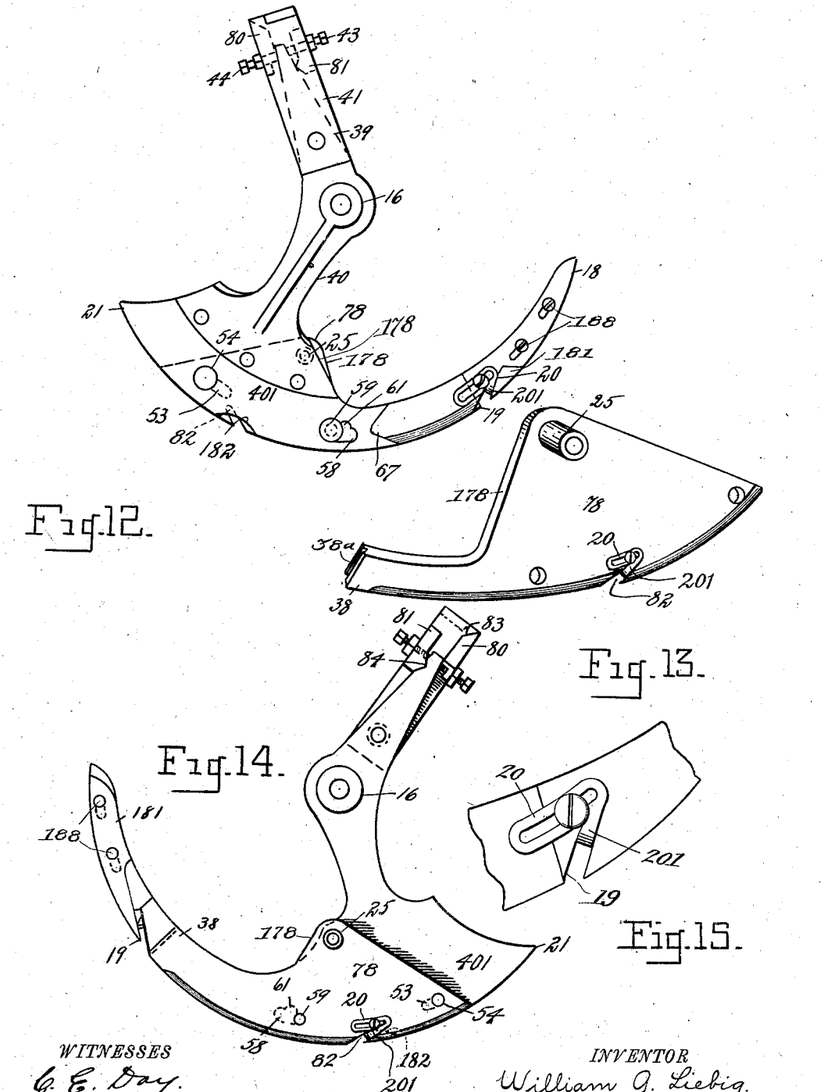

It will be noticed in Figs. 13 and 14 that the peripheral edge of the plate 78 is beveled somewhat. The purpose of this is to reduce to a minimum the frictional surface of the engaging edge of the carrier, so that as it moves to and fro against the store of bristles it will disturb as little as possible their transverse position with respect to the edge of the carrier. This beveling is not, however, so pronounced as to make the engaging edge injuriously sharp.

In Fig. 12 is shown a desirable sectional construction of the carrier, which permits its being composed of several pieces, each of which can be replaced when broken without making it necessary to discard the uninjured parts, the angular line 67 marking the point at which one of these more slender parts joins the foot portion 401 of the carrier.

In order that the arm 39 may be properly adjusted to produce the results, it is made in two parts 39 and 41, pivotally connected and with the extreme end of the part 39 engaging between the adjusting-screws 43 and 44, which are inserted through lugs on the edges of the part 41, and bear against the end of the part 39. The part 41 carries the projecting cam-lugs 80 and 81 and these can be properly adjusted to coact with the pin 79 and the wrist-pin 25 and its actuator to properly time the movements above described. The cam which drives the cross-head in which the pin 25 engages is provided with the yielding guide 32, already referred to, and with a fixed guide 33, the latter of which insures the proper engagement between the roller-bearing 31 and the cam 30 and the former of which, 32, insures an engagement of the roller-bearing of the cam, which, however, may yield slightly against the tension of spring 35, but which is limited in its movement by a pin 135, that projects from the face of the wheel and engages in slot 136 in the guide 32.

A provision for any inequality of friction is employed in connection with the hammer-driving lever 7, the rear end of which is provided with a hook 57ª, that catches or may catch temporarily on the pin 88 on the cam 37 and causes a lifting of the forward end or hammer end of the lever 7, should the weight for any reason be insufficient. The table 15, upon which the brush-back rests, is mounted at the upper end of a screw 90 with a universal joint and is adjusted for inclination around the joint and held in its adjusted position by a brace 91, that is pinned to lugs 92. The bristles are held in a box 60, capable of adjustability as to width and provided with a follower 6ª, adapted to push the mass of bristles forward with their front surface constantly in engagement with the gatherer and carrier.

In order that the box 60 may be adjustable for width, the bottom 63 is provided with ears 63ª, that extend toward the sides, and the ears are slotted for the reception of bolts. The sides 64 are provided with foot-pieces 65, through which bolts engage, and these bolts engage through the slots in the bottom, so that the sides 64 may be contracted or spread within the limit of movement determined by the length of the slots 66. The bottom 63 and the top 67 are each provided with guide-rails 68, between which engages the central follower 6ª, forced forward by a weight hung by a cord 69, that passes over sheaves 70. The top 67 is hinged to risers 7° and provided at its forward end with a pair of pivoted latches 7ᵈ, by which it is held to the bottom.

In operation the gathering of a tuft of bristles is accomplished during the backward stroke of the carrier, which sweeps across the face to the bristles and gathers in the notch 19 all that the notch will hold. During this retrograde movement of the gatherer the plate 78 has traveled to the extent of its sliding movement toward the heel 21. At the beginning of the forward oscillation the plate 78 slides to the limit of its independent movement toward the toe of the gatherer, opening the notch 182 and swinging the guard-plate 78 to confine the bristles that have been gathered in the notch 19. During the forward movement the bristles in the notch 19 are carried to the staple. The bristles on the face of the receptacle are carried downward, tending to accumulate them toward the bottom of the plunger. There they are left on the next retrograde movement of the carrier to be picked up by the approaching notch 19, and to aid in the assembling of the bristles in this portion of the receptacle 60 in a compact mass a movable finger 93 extends centrally forward in the receptacle 60 under a strain of a spring 94, which tends to lift the point of it as against the downward pressure of the gatherer in its forward movement. This counteracts the tendency of the bristles to descend too far when under pressure from the vicinity of notch 182 of the downwardly-descending carrier. After the gatherer has been oscillated to bring a bunch of bristles into place under the staple the staple-forming mechanism and the hammer are forced downward, first forming a staple above the bunch of bristles, next driving the staple, with the bristles engaged between the legs of it, through the mouth 14 and through the guide 141 and into the brush-back on the table 15.

What I claim is—

1. In a brush-making machine, in combination with a receptacle for brush-tuft material, an oscillating tuft gatherer and carrier engaging with its edge against said material, there being a notch in said edge wherein a tuft is held during a portion of each oscillation, means for causing the release of the tuft therefrom at its intended point of delivery, means for locating thereover a staple in position to be driven, and means for thereafter engaging the staple and tuft and forcing the same free from said staple-locating means and into the brush-back, substantially as described.

2. In a brush-making machine, a receptacle for brush-tuft material provided with a follower adapted to force bristles toward the open end of the receptacle, an oscillating notched tuft gatherer and carrier constantly engaging the mass of bristles with some portion of its periphery, and means for effecting the regular closure and opening of the notch and for causing the gatherer and carrier to oscillate across the receptacle, substantially as described.

3. In a brush-making machine, a tuft gatherer and carrier having in combination a pivoted arm, a wrist-pin-carrying plate carried by said arm, and having both an oscillating and a sliding movement with respect to said arm, one of said parts being provided with a notch which the other parts opens and closes, and reciprocating actuating means engaged by said wrist-pin, substantially as described.

4. A tuft gatherer and carrier for a brush-making machine having in combination a pivotally-supported arm having an indented periphery, some portion of which is adapted to be in constant engagement with a mass of bristles, a supplemental piece adjustably fixed to said arm and forming with the adjacent portion thereof a tuft-holding notch, and a plate slidably attached to one face of said arm and adapted to close said notch during a certain period in each oscillation, said plate having a bristle-engaging notch in its periphery, substantially as described.

5. In a brush-making machine, in combination with an oscillating gatherer and carrier having two parts, one being supported by the other and being slidable with respect thereto, driving means engaging one of said parts, and a movable abutment engaging the other of said parts, adapted to cause relative movement of the two parts, substantially as described.

6. In a brush-making machine, in combination, an oscillating gatherer and carrier having two slidably-connected parts, a reciprocating hammer-driver having means thereon to engage one of said parts, a reciprocating actuator engaged by the second of said parts, a cam provided with a yielding guide whereby an irregular motion is communicated to parts in contact therewith, and a pivoted lever engaging said cam with one end and said reciprocating actuator with the other end, substantially as described.

7. In combination with an oscillating gatherer and carrier of a brush-making machine, a cam provided with a yielding guide adapted to impart a faltering motion as the carrier reaches its lowermost point of travel whereby the commencement of its positive upward movement is momentarily deferred, and interconnecting mechanism between the gatherer and the cam, substantially as described.

8. In a brush-making machine, in combination, a driver for driving a staple with a tuft of bristles therein, and a tuft-gatherer adapted to gather a tuft and deposit the same under the staple, a portion of said gatherer being formed as a staple-guide, substantially as described.

9. In a tuft-gatherer for brush-making machines, in combination with a pivoted gatherer having a notched periphery adapted to engage a mass of bristles and to select and remove therein a tuft of bristles at each oscillation, a reciprocating actuator for said arm, a cam having a yielding guide adapted to impart a faltering motion, and a pivoted lever whereby the actuation imparted by the cam is communicated to said reciprocating member, substantially as described.

10. In a tuft-gatherer for brush-making machines, in combination with a pivoted arm having a tuft-carrying notch in its periphery, one side of the engaging portion of said notch being formed by the body portion of said arm, a supplemental piece adjustably fixed to said arm and adapted to be moved substantially parallel with the adjacent toe portion thereof, one end face of said piece forming the other side of said notch, and means carried by said arm whereby the notch is opened and closed, substantially as described.

11. In a tuft-gatherer for brush-making machines, in combination with a pivoted arm provided with a tuft-carrying notch, a plate slidably carried thereby and provided with a feed-notch, and separate means for adjusting the size of each of said notches, substantially as described.

12. In a tuft-gatherer for brush-making machines, in combination with a pivoted arm, a plate slidably connected thereto and provided with a grooved terminal adapted to serve as a staple-guide, the arm and the plate each having a tuft-receiving notch in its periphery, substantially as described.

13. In a tuft-gatherer for brush-making machines, in combination with a pivoted carrier, a toe-piece adjustably connected thereto and forming with the body of the carrier a notch adjustable as to width, substantially as described.

14. In a brush-making machine, in combination with means for pressing forward a mass of bristles, a pivoted arm having a notched engaging periphery adapted to oscillate transversely of the same, a plate having a notched periphery slidably connected thereto, said plate being adapted to confine within the notch in the arm a tuft of bristles taken from the mass and to arrange the bristles remaining in the mass for subsequent removals by engagement thereagainst of its notched periphery, means adapted to forcibly engage said pivoted arm to cause the release of the tuft at a predetermined point, means for placing over said tuft at the time of its release a staple in position to be driven, and means for thereafter driving both the staple and the tuft into the brush-back, substantially as described.

15. In a brush-making machine, in combination with means for forcing thereagainst a mass of bristles, a bristle-carrier having a notched periphery arranged to engage against said mass and remove a tuft therefrom at each oscillation thereof, means for causing said carrier to release said tuft at the end of each stroke, means for locating a staple over said tuft at the moment of release thereof, and means for subsequently forcing said tuft and staple into the brush-back, substantially as described.

16. In a brush-making machine, in combination with means for feeding forward a mass of bristles, a pivoted arm having a curved periphery with tuft-carrying notches adapted to engage thereagainst, a plate slidably secured to one side of said arm and adapted to be slid to a position of closure with respect to one of said notches, means for oscillating the plate and thereby the arm, and means for causing said plate to move from its position of closure at a predetermined point in each oscillation, substantially as described.

17. In a brush-making machine, in combination with a carrier for removing tufts from a mass of bristles, actuating means therefor, and means for engaging the carrier at the end of each stroke for accomplishing the ejection of the tuft at the point of its union with its holding-staple, substantially as described.

18. In a brush-making machine, a tuft gatherer and carrier comprising a pivoted arm having a curved periphery with a tuft-receiving notch near one end and a clearance-notch near the opposite end thereof, and a plate slidably connected therewith provided with a peripheral bristle-arranging notch, said plate being adapted to serve as a closure to the tuft-engaging notch in the arm when its bristle-arranging notch is opposite the clearance-notch, substantially as described.

19. In a brush-making machine, in combination with means for feeding a staple forward in position to be driven, an oscillatory notched tuft gatherer and carrier adapted to have some portion of its periphery in constant engagement against a supply of bristles and to select therefrom at each oscillation a tuft of determinate size, means for actuating the gatherer and carrier to locate the tuft at its point of intended deposit between the depending portions of the staple, and a reciprocating slide adapted to forcibly engage a portion of the tuft gatherer and carrier to accomplish the release of the tuft therefrom and to thereafter drive the staple and tuft into the brush-back, substantially as described.

20. In a brush-making machine, the combination of means for feeding forward a mass of bristles in bulk, and a notched oscillating carrier having some portion of its periphery in constant engagement therewith, the notched portion being adapted to select a predetermined quantity from the mass of bristles at each oscillation and to deposit the same at their intended point of delivery at a later phase of its oscillation, a portion of said carrier being fashioned to automatically close the notched portion, and to be withdrawn from its position of closure at certain points in each cycle of operation of the carrier, substantially as described.

In testimony whereof I sign this specification in the presence of two witnesses.

WILLIAM G. LIEBIG.

Witnesses:
CHARLES F. BURTON,
MAY E. KOTT.